United States Patent
Zaydman

(10) Patent No.: US 10,430,379 B2
(45) Date of Patent: Oct. 1, 2019

(54) IDENTIFYING COMMON FILE-SEGMENT SEQUENCES

(71) Applicant: VMware, Inc., Palo Alto, CA (US)

(72) Inventor: Oleg Zaydman, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 299 days.

(21) Appl. No.: 15/614,540

(22) Filed: Jun. 5, 2017

(65) Prior Publication Data

US 2018/0349397 A1    Dec. 6, 2018

(51) Int. Cl.
  *G06F 16/13*  (2019.01)
  *G06F 9/455*  (2018.01)
  *G06F 16/22*  (2019.01)

(52) U.S. Cl.
  CPC ........ *G06F 16/137* (2019.01); *G06F 9/45558* (2013.01); *G06F 16/2255* (2019.01); *G06F 2009/45562* (2013.01)

(58) Field of Classification Search
  CPC . G06F 16/137; G06F 16/2255; G06F 9/45558
  See application file for complete search history.

(56) References Cited

U.S. PATENT DOCUMENTS 7,454,479 B2    11/2008    Alexander et al.
9,195,494 B2 *  11/2015    Frank ................. G06F 9/45558
2006/0071122 A1  4/2006    St. Clair
2010/0250934 A1* 9/2010    Watanabe ............... G06F 21/79
                                                 713/168
2016/0070854 A1  3/2016    Wong et al.

OTHER PUBLICATIONS

Bin Fan, David G. Andersen, Michael Kaminskyy, Michael D. Mitzenmacherz "Cuckoo Filter: Practically Better Than Bloom" CoNEXT'14, Dec 2-5, 2014, Sydney, Australia, ACM 978-1-4503-3279—Aug. 14, 2012.

* cited by examiner

Primary Examiner — Loc Tran

(57) ABSTRACT

Virtual-machine images (VMIs) can be compressed by identifying common cluster sequences shared across VMIs. To identify these sequences, hashes are generated for each cluster in each VMI, resulting in hash files for respective VMIs. The hashes are partitioned to address memory constraints. For each partition, its hashes are entered into buckets of a hash map according to their respective hash values. Each (non-empty) bucket associates a key hash value with one or more pointers to locations in the hash files. Clusters of hashes are fetched from the hash files referenced by multi-pointer buckets. The hash clusters are scanned across clusters to identify common hash sequences. Common cluster sequences are then identified based on the common hash sequences. This process works with files other than VMIs and with segment sizes other than clusters.

8 Claims, 3 Drawing Sheets

IDENTIFYING COMMON FILE-SEGMENT SEQUENCES

BACKGROUND

In the case of a (physical) machine, the software that defines the functionality for the machine can be stored on non-transitory mass storage media, e.g., a hard disk. A hard disk is typically formatted into sectors, and an operating system typically stores data in clusters, which are contiguous groups of sectors. The operating system also typically aligns files with cluster boundaries, e.g., most files begin at a respective cluster boundary. The data physically encoded on the hard disk forms, in effect, a two-dimensional arrangement of representations of bits. This two-dimensional representation is often referred to as a disk image. The functionality of a computer can be transferred to another computer with identical hardware by transferring the disk image.

Herein, "machine" refers to the hardware of a computer. A typical machine is managed by an operating system, which typically hosts a computer application. A "virtual machine" is not a machine, but is software that appears as if it were a machine to a "guest" operating system that it hosts.

As with a physical machine, the functionality of a virtual machine can be physically encoded onto a hard disk, in this case, to form a virtual-machine image. However, the virtual machine image can include the virtual-machine itself in addition to a guest operating system and application software. This means that the functionality of a virtual machine can be transferred between machines with dissimilar hardware, as long as the machines are running compatible hypervisors (i.e., virtualizing operating systems).

The fact that virtual machines can be packaged as virtual-machine images has many advantages. For example, if a virtual machine is running up against hardware limitations of its physical machine host, its image can be cloned and the clone can be transferred to other hardware so that two instances of the virtual machine can be operated in parallel to increase throughput. Of course, this "scaling out" can be expanded to larger numbers of parallel instances of a virtual machine.

As a result of this versatility, virtual machine images can proliferate, consuming storage capacity where they reside and bandwidth as they are transferred. Their relatively large sizes, e.g., tens of gigabytes, can tax storage and communications resources. Compression of virtual-machine images can save storage capacity and bandwidth, but sometimes the necessary processing power results in a poor tradeoff between cost and benefit.

DETAILED DESCRIPTION

In accordance with the present invention, groups of virtual-machine images (VMI) are compressed by identifying common cluster sequences and substituting pointers to a common cluster-sequence file for the instances of the sequences in the VMI themselves. Hash partitioning and neighbor searching are used to identify the common sequences of clusters. In addition, the identified common sequences can be helpful in "teleporting" files, i.e., effectively transferring a file from a source to a target by identifying building blocks at the target that can be used to construct all or part of a replica of the file.

The sequence-identifying process has applicability to virtual-machine images, which are files that encapsulate other files, e.g., associated with a hosted guest operating system instance and any applications running thereon. The guest operating system typically divides files into segments known as "clusters", which define a minimum size for fetches from mass storage. The encapsulated files are aligned with cluster boundaries, making it likely that two virtual-machine images with the same subfiles will have clusters and cluster sequences in common. The invention also has applicability to other file types, e.g., disk images, that encapsulate boundary-aligned subfiles. Instead of clusters, the unit file segments can be groups of clusters or other segment unit.

Figure 1:
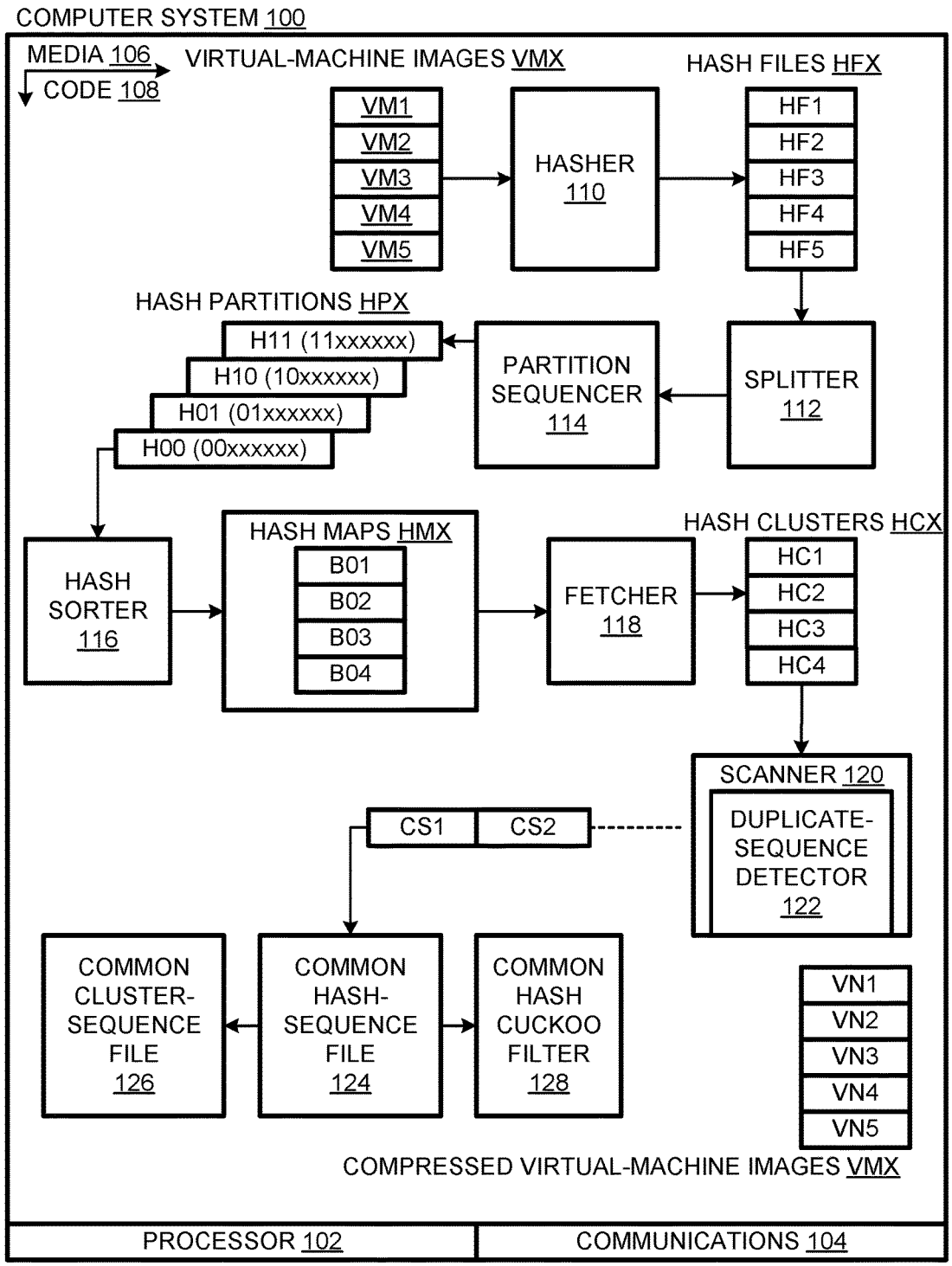
FIG. 1 is a schematic diagram of a computer system that provides for identifying common cluster sequences in virtual-machine images.

For example, as shown in FIG. 1, a computer system 100 includes a processor 102, communications devices 104, and non-transitory media 106. Media 106, including memory and mass storage, is encoded with code 108 for defining functions and structures of computer system 100 and for, when executed by processor 102, providing for implementing a process 200, flow charted in FIG. 2.

Process 200 begins at 201 with plural virtual-machine images. The invention can be applied to any counting number of virtual-machine images, but the incidences of common cluster sequences are usually much greater when plural virtual-machine images are compared. Of course, the invention can accommodate, instead of virtual-machine images, other disk images or other boundary-aligned segmented files.

Thus, as shown in FIG. 1, computer system 100 includes virtual-machine images VMX, including virtual-machine images VM1, VM2, VM3, VM4, and VM5. In various scenarios, the number of virtual-machine images can vary. In general, the virtual-machine images are stored on hard disks or other mass storage media due to their large size, typically tens of gigabytes.

At 202 (FIG. 2), the clusters of the virtual-machine images are hashed to yield respective hash files. Thus, for example, computer system 100, FIG. 1, includes a hash generator, aka "hasher" 110, that generates hash files HFX includes hash files HF1, HF2, HF3, HF4, and HF5, respectively from virtual machine images VM1, VM2, VM3, VM4, and VM5. The hash files preserve locality in that the order of the hashes in a hash file is the same as the order of the corresponding clusters (in the respective virtual-machine image). Therefore, the location of a hash in a hash file identifies the location of the corresponding cluster in the corresponding virtual-machine image.

Each hash file, as with each virtual-machine image, is arranged as a series of clusters; accordingly, "VMI-cluster" and "hash-cluster" are used as labels below to distinguish clusters when not otherwise distinguished by context. The cluster size can correspond to the minimum size object that can be fetched from mass storage. For example, a cluster can be 4096 bytes in size. A 4096-byte cluster can hold 128 32-byte hashes, for example.

Figure 2:
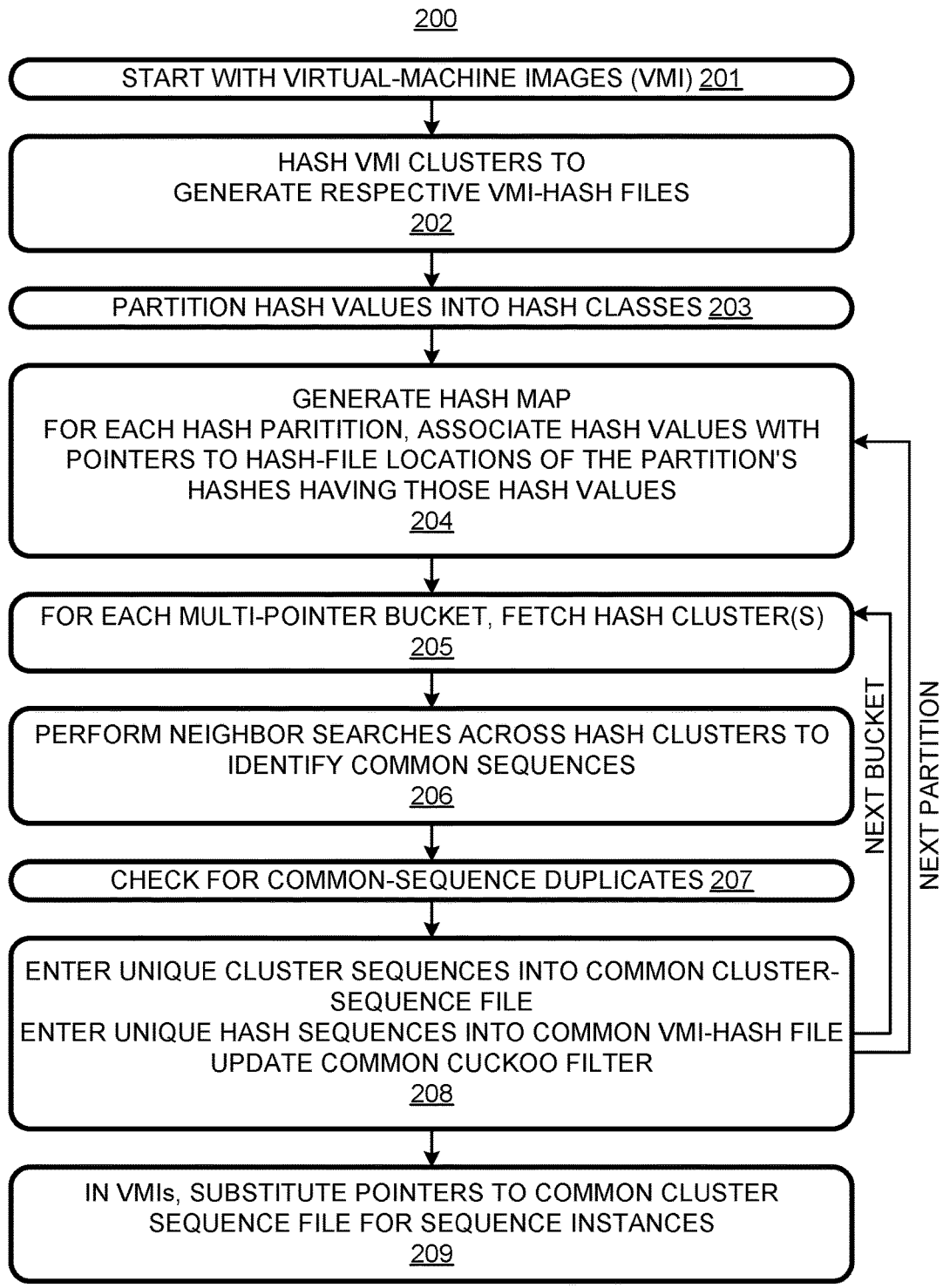
FIG. 2 is a flow chart of a process for identifying common cluster sequences in virtual-machine images.

At 203, FIG. 2, hash values are partitioned into hash classes. This is a conceptual action, basically defining classes into which actual hashes may be divided. The partitions and classes can be defined, for example, by the leading bits of the hashes. For example, the eight leading bits of hashes can be used to distinguish 256 partitions. These partitions can be processed one at a time so that memory requirements for processing the hashes can be reduced by orders of magnitude (again, depending on the number of partitions).

Accordingly, computer system 100 (FIG. 1) includes a splitter 112 that separates the hashes of hash files HFX into hash partitions HPX, e.g., four partitions H00, H01, H10, and H11 according to their leading two bits. Partition sequencer 114 feeds hashes in the partitions forward for processing. As indicated in FIG. 1, hashes of hash partition H00 are processed before hashes of hash partition H01, which are processed before hashes of hash partition H10, which are processed before hashes of hash partition H11. Of course, this order can vary in different scenarios. The point is that memory limitations can be accommodated by partitioning the hashes and processing one partition at a time.

At 204, FIG. 2, for each hash partition, a respective hash map is generated. In the hash maps, hash values are associated with pointers to locations (in hash files) of hashes having those hash values. For example, all hashes in hash values having a particular hash value can be gathered in a "bucket". Each bucket can have a key hash value associated with one or more hash-file locations. Each of those hash-file locations has a hash, the value of which is equal to the key hash value of the bucket. "Multi-pointer buckets", i.e., those with two or more pointers to hash-file locations, represent common clusters, that is, identical clusters that reside in different virtual-machine images or different locations within the same virtual-machine image.

For example, computer system 100, FIG. 1, includes a hash sorter 116 that accepts hashes of the partition being currently processed and associates their respective locations with their respective hash values in a hash map 117 that contains the aforementioned "buckets", e.g., buckets B01, B02, B03, and B04. A hash map can be implemented using various types of data structures, e.g., tables in which the hash values are a key field, and in which multiple hash locations can be associated with each key hash value.

Alternatively, a "chaining" structure can be used that can grow as instances of new hash values are processed. In a chaining structure, a new bucket is added to a chain of buckets (or used to start a new chain) when a new hash value is encountered. Thus, each bucket has at least one pointer to a hash. An advantage of such a chaining structure is that empty buckets, that might otherwise consume some memory or processing time, can be avoided.

At 205, FIG. 2, for each multi-pointer bucket, one or more hash clusters that respectively include the referenced hash locations are fetched into memory. Depending on the variation, one hash cluster may be fetched per location or a series of hash clusters may be fetched per location (to prepare for common sequences that extend across cluster boundaries. All of these fetched clusters are held in memory together so that they can be rapidly scanned for common sequences. Computer system 100, FIG. 1, has a fetcher 118 for fetching the hash clusters HCX, e.g., hash clusters HC1, HC2, HC3, and HC4, from mass storage into memory.

At 206, neighbor searches are performed across the fetched hash clusters (or series of clusters) to identify common sequences. Herein, the location for which a cluster was fetched is referred to as its "origin location" or, more simply, its "origin". Conceptually, the fetched clusters can be arranged so that their origins are aligned. The hash values at the aligned origins match each other because they match the key hash value for the multi-pointer bucket being processed. Stepping one hash forward, the immediate successor neighbors of the clusters are compared. Matches corresponding to hash sequences have at least two hashes. The forward scanning can continue until there are no more common sequences that include the origin. Then starting again at the origins, rearward scanning is performed to start new sequences or extend forward sequences rearward.

When exactly two sequences are in common, the common sequence ends wherever the two sequences diverge. For common sequences with three or more members, a common sequence between a subset of the original members may continue even as one or more other members diverge. For example, three sequences may match over the first ten hashes, then one sequence may diverge while the other two sequences continue for another five hashes. In this situation, there is one two-member sequence that extends fifteen hashes, a two-member sequence that extends from the break five hashes, and a three member common sequence that extends ten hashes.

Embodiments differ in which of these three sequences are to be retained for further use. The illustrated embodiment retains the ten-hash three-member hash sequence and the five-hash two member hash sequence and ignores the fifteen hash two member common sequence. This reduces the number of common sequences that start with the same hash; this can enhance performance when the first hash of a sequence is used to find matches with other sequences. Other embodiments retain the fifteen hash two member sequence either in addition to the other two or instead of the five hash two-member common sequence. In any event, the result of action 206 on the first bucket of the first partition can include zero, one, or more common sequences. Computer system 100 includes a scanner 120 that identifies these common sequences CS1, CS2, etc.

Duplicate-sequence detection is performed at 207, FIG. 2. For purposes of building a file of common cluster sequences, only one instance of each unique common sequence is desired. Additional instances are redundant and wasteful. Thus, when a common sequence is found at 206, a check is performed to determine whether the common sequence is a new and distinct common sequence. If it is not new, it should not result in an addition to the common cluster sequence file.

While the identification of common sequences at 206 and the detection of duplicate common sequences at 207 are shown separately in FIG. 2, there are cases where duplication can be recognized as a common sequence is being constructed. For example, if a common sequence expands to include a hash that has a value matching the key value of a previously processed bucket, then it the current common sequence matches a common sequence identified when that previous bucket was processed. Accordingly, neighbor searching for the current common sequence can stop and the current common sequence can be discarded as a duplicate. For this reason, scanner 120, FIG. 1, includes a duplicate-sequence detector 122.

Duplicate-sequence detection can also occur during neighbor searching when a common sequence expands to include first and second hashes having values equal to the key value for the currently processed bucket. In that case, the first hash will be at the origin of a first sequence being compared and the second hash will be at the origin of a second sequence being compared. Instead of being duplicates, they are merely two instances of the same sequence. Accordingly, one of the first and second sequences should be removed from consideration in identifying a common sequence. If the first and second sequences are the only two that match, then there is no common sequence to identify. If there are additional sequences with the two matching hash values, then a new common sequence may still be identified.

Another approach checks whether a common hash sequence matches a hash sequence in the common hash-sequence file. This can be done by selecting the first (or other) hash in a hash sequence and checking the common hash-sequence file for a match. If a match is found, immediate neighbors can be checked for matches. If the neighboring hashes do not match, the proposed common sequence can be added; otherwise it is discarded. This approach can be implemented using integrated duplicate detector 122 (FIG. 1) or a duplicate-sequence detector that is separate from the neighbor scanner.

At 208, FIG. 2, unique (non-duplicate) common hash sequences can be added to the common hash-sequence file, and the corresponding unique cluster sequences can be appended to the common cluster-sequence file. As shown in FIG. 1, computer system 100 includes a common hash sequence file 124 and a common cluster-sequence file 126.

In some embodiments, a common cuckoo filter, e.g., common cuckoo filter 128 of FIG. 1, is updated when sequences are added to the common cluster sequence file and the common hash-sequence file. The key entries of the cuckoo filter are fingerprints of the first hash in common hash sequences. Associated with each key fingerprint is a pointer to the location of the corresponding hash in the common hash-sequence file. The cuckoo filter can be used for duplicate detection in that it can be used to locate hashes in the common hash-sequence file that match an incoming hash. When a match is found, neighbor searching can then determine whether a new common hash sequence matches a hash sequence already in the common hash-sequence file. Such match checking can also be used to find common hash sequences and corresponding common clusters sequences for compressing virtual-machine images other than those that were used to generate the common cluster-sequence file.

Actions 205 (fetch) through 208 (enter common sequences) can be iterated for each multi-location bucket in the current partition. Actions 204 (generate hash map) through 208 can be iterated for succeeding partitions. Note, because hashes in later-processed partitions are increasingly likely to have appeared in a previously identified common hash sequence, the number of sequences found per partition tends to decrease for the later processed partitions. (As noted above with respect to duplicate sequence detection, if a hash from a previously processed hash class is found in more than one sequence with the same origin, it is already present in the common cluster-sequence file (as it would be the origin in one of the previous partition passes).

At 209, FIG. 2, pointers to locations in the common cluster-sequence file are substituted for instances of the common cluster sequences in the virtual-machine images to effect compression. In FIG. 1, compressed virtual-machine images VN1, VN2, VN3, VN4, and VN5 are compressed versions of virtual-machine images VM1, VM2, VM3, VM4, and VM5, respectively, that have resulted from the substitutions of pointers for common cluster sequence instances.

Figure 3:
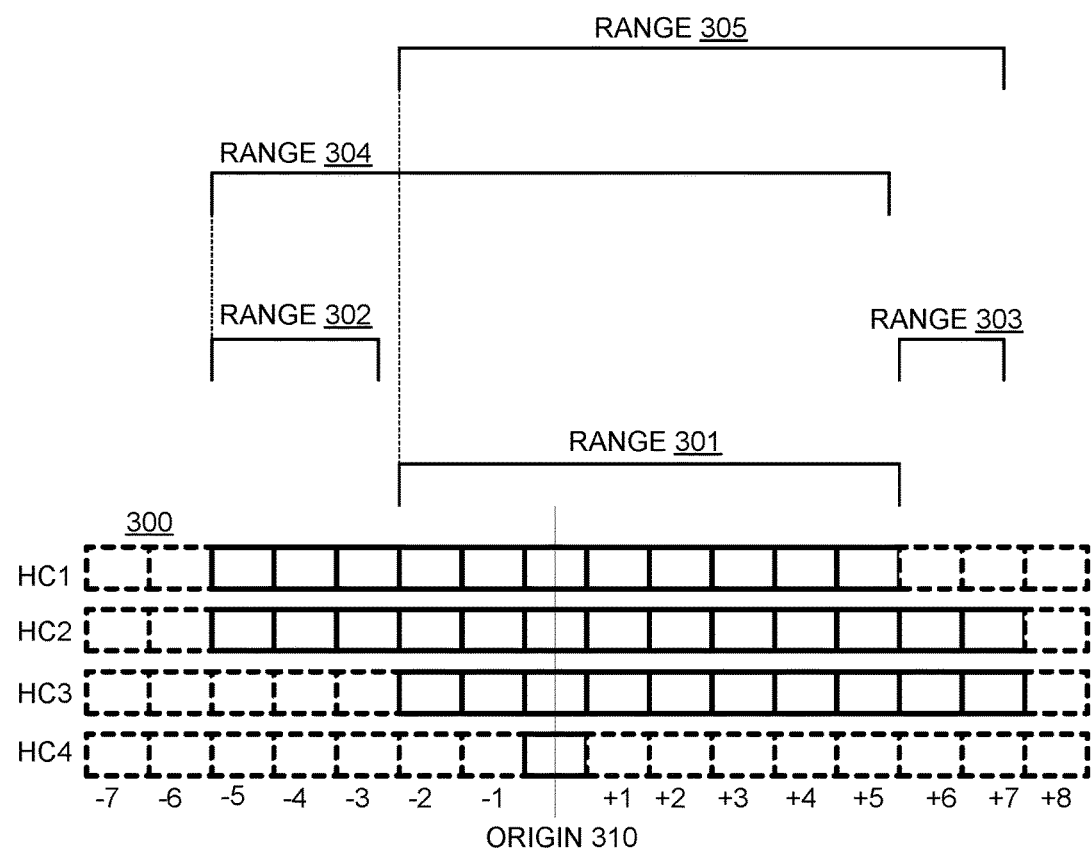
FIG. 3 is a schematic diagram of a result of scanning hash clusters for common hash sequences that correspond to common cluster sequences.

An example of a neighbor search performed by scanner 120 is illustrated in FIG. 3. This example corresponds to a bucket with four pointers so that four hash clusters HC1, HC2, HC3, and HC4 have been fetched and arranged for coordinated scanning. Hashes with the key value for the bucket are aligned at origin 310. Thus, as indicated by rectangles with solid borders in FIG. 3, hash clusters HC1, HC2, HC3, and HC4 have matching hashes at locations aligned with origin 310. As indicated by rectangles with dashed borders, no other hashes of hash cluster HC4 match a hash of another hash cluster at any position (−7 to +8) other than at the origin. Thus, hash cluster HC4 is not a member of any common hash sequence associated with the current bucket.

A forward (rightward) neighbor search determines that hash clusters HC1, HC2, and HC3 match up to position +5, at which point HC1 diverges. HC2 and HC3 continue to match at +6 and +7, but diverge after +7, ending the forward neighbor search. A rearward (leftward) neighbor search determines that the match among hash clusters HC1, HC2, and HC3 extends rearward to positions −1 and −2, at which point, hash cluster HC3 diverges. Hash clusters HC1 and HC2 continue to match until position −5, beyond that, they diverge. In variations, the forward and rearward searches may be performed concurrently or in the reverse order.

The neighbor search turns up five match ranges, 301, 302, 303, 304, and 305. In some embodiments, the five matching sequences corresponding to the five ranges would be included in the common hash sequence file, while the corresponding common cluster sequences would be added to the common cluster sequence file. However, to avoid having hashes and VMI clusters appear more than once in the common hash file or the common cluster file, and to make it easier to find matches in the common hash file and the common cluster file, the illustrated embodiment does not include sequences corresponding to ranges 304 and 305 in the common hash-sequence file. Rather, the common sequences corresponding to the non-overlapping ranges 302, 301, and 303 are represented in the common hash and cluster files.

As mentioned above, the invention has applicability to teleportation of VMIs and similar file types. Herein, "teleportation" refers to a process of reconstructing, on a target node, an object located on a source node using building blocks identified on the target node. In an example, a hash file of hashes of clusters of a VMI on a source node is generated and transferred to the target node. Each hash in the hash file is compared to hashes in a common hash-sequence file. This process can be greatly facilitated using a cuckoo filter that associates fingerprints of hashes with pointers to locations of the respective hashes in the common hash-sequence file.

Once a hash match is found, a neighbor search can determine the extent of any hash sequence in common between the current hash file and the common hash-sequence file. When a sequence match is found, a pointer to the corresponding sequence in the common cluster-sequence file is inserted in the under-construction replica of the source VMI. Each found match avoids the need to transfer the corresponding cluster sequence from the source node. Also, the resulting reconstruction is compressed as it is constructed.

More generally, the invention provides for effective compression and efficient storage by requiring only one instance per common sequence, e.g., an instance in a common sequence file. All other instances can be replaced with or represented by pointers to the common sequence in the common sequence file. In addition to storage "compression" by reusing sequences across multiple files, the common sequences themselves can be compressed using ZIP or any other compression algorithm. Sequences tend to compress better than the sum of individually compressed clusters.

Herein, all art, if any, labeled "prior art" is admitted prior art; art not labelled "prior art" is not admitted prior art. The illustrated embodiments, and variations thereupon and modifications thereto are provided for by the present invention, the scope of which is defined by the following claims.

What is claimed is:

1. A process comprising:
   generating respective content hash files from content files, each content hash file including hashes of respective segments of the content files, wherein the content files are virtual-machine images;
   partitioning hash values to define hash classes;
   in respective time intervals for respective ones of the hash classes, multi-populate a respective set of buckets of a respective data structure, each bucket of the respective set being multi-populated with a key value and pointers to locations in the hash files, the locations pointed to containing hashes with the respective key value, at least two of the time intervals being non-overlapping;
   for each bucket, for each of the plural pointers, fetch a respective set of contiguous series of hash values from respective content hash files, each contiguous series having an origin location including a key hash with the respective key value;
   for each of the plural hash values associated with plural locations, for each respective set of contiguous series of hash values, performing a neighbor search about the respective key values to identify common content hash sequences, wherein the performing a neighbor search includes, for each multi-populated bucket, identifying redundant contiguous series of the respective set of contiguous series and excluding redundant contiguous series from a common sequence of hashes;
   and determine common cluster sequences in the content files based on the common content hash sequences.

2. The process of claim 1 wherein the neighbor searching is forward and backward with respect to origin locations.

3. The process of claim 1 wherein the common cluster sequence file excludes overlapping common cluster sequences.

4. The process of claim 1 further comprising compressing the virtual-machine images by replacing instances of common-cluster sequences in the virtual-machine images with pointers to the common cluster sequences in the common-cluster-sequence file.

5. A system comprising a computing processor, non-transitory media encoded with code that, when executed by the computing processor, implements a process including:
   generating respective content hash files from content files, each content hash file including hashes of respective segments of the content files, wherein the content files are virtual-machine images;
   partitioning hash values to define hash classes;
   in respective time intervals for respective ones of the hash classes, multi-populate a respective set of buckets of a respective data structure, each bucket of the respective set being multi-populated with a key value and pointers to locations in the hash files, the locations pointed to containing hashes with the respective key value, at least two of the time intervals being non-overlapping;
   for each bucket, for each of the plural pointers, fetch a respective set of contiguous series of hash values from respective content hash files, each contiguous series having an origin location including a key hash with the respective key value;
   for each of the plural hash values associated with plural locations, for each respective set of contiguous series of hash values, performing a neighbor search about the respective key values to identify common content hash sequences, wherein the performing a neighbor search includes, for each multi-populated bucket, identifying redundant contiguous series of the respective set of contiguous series and excluding redundant contiguous series from a common sequence of hashes; and
   determine common cluster sequences in the content files based on the common content hash sequences.

6. The process of claim 5 wherein the neighbor searching is forward and backward with respect to origin locations.

7. The process of claim 5 wherein the common cluster sequence file excludes overlapping common cluster sequences.

8. The process of claim 5 further comprising compressing the virtual-machine images by replacing instances of common-cluster sequences in the virtual-machine images with pointers to the common cluster sequences in the common-cluster-sequence file.

* * * * *